United States Patent
Harrison et al.

(10) Patent No.: US 9,203,326 B2
(45) Date of Patent: Dec. 1, 2015

(54) FEED FORWARD CONTROL FOR A CYCLO-CONVERTER

(75) Inventors: Michael John Harrison, Christchurch (NZ); Huaqiang Li, Mendham, NJ (US); Yakov Familiant, Milwaukee, WI (US)

(73) Assignee: Eaton Industries Company, Christchurch (NZ)

( * ) Notice: Subject to any disclaimer, the term of this patent is extended or adjusted under 35 U.S.C. 154(b) by 398 days.

(21) Appl. No.: 13/805,424

(22) PCT Filed: Jun. 15, 2011

(86) PCT No.: PCT/NZ2011/000110
§ 371 (c)(1),
(2), (4) Date: Apr. 8, 2013

(87) PCT Pub. No.: WO2012/002825
PCT Pub. Date: Jan. 5, 2012

(65) Prior Publication Data
US 2013/0194850 A1    Aug. 1, 2013

(30) Foreign Application Priority Data
Jun. 29, 2010    (NZ) ........................................ 586494

(51) Int. Cl.
H02M 7/217     (2006.01)
H02M 5/297     (2006.01)
H02M 1/00      (2007.01)

(52) U.S. Cl.
CPC ...... *H02M 7/217* (2013.01); *H02M 2001/0022* (2013.01); *Y02B 70/1441* (2013.01)

(58) Field of Classification Search
CPC ....... H02M 5/27; H02M 5/271; H02M 5/297; H02M 2005/2932; H02M 3/335; Y02B 70/1433

USPC ............. 363/157, 159, 163, 164, 165, 21.02, 363/21.03, 125, 127
See application file for complete search history.

(56) References Cited

U.S. PATENT DOCUMENTS 3,982,167 A * 9/1976 Espelage ...................... 363/165
2002/0067139 A1   6/2002 Sabate

FOREIGN PATENT DOCUMENTS

WO   WO 2008/018802 A2    2/2008

OTHER PUBLICATIONS

Garcia-Gil R. et al., "Bi-directional Three-Phase Rectifier with High-Frequency Isolation and Power Factor Correction", *2004 25th Annual IEEE Power Electronics Specialists Conference*, Aachen, Germany, pp. 2689-2874.
International Preliminary Report on Patentability and Written Opinion Corresponding to International Application No. PCT/NZ2011/000110; Date of Mailing: Jan. 17, 2013; 9 Pages.
International Search Report Corresponding to International Application No. PCT/NZ2011/000110; Date of Mailing: May 29, 2012; 4 Pages.

(Continued)

*Primary Examiner* — Gary L Laxton
(74) *Attorney, Agent, or Firm* — Myers Bigel Sibley & Sajovec, P.A.

(57) ABSTRACT

A three-phase resonant cyclo-converter, the cyclo-converter comprising a feed forward control module arranged to develop a feed forward signal for controlling a switching frequency of the cyclo-converter dependent on conditions of a power supply arranged to provide power to the cyclo-converter.

22 Claims, 6 Drawing Sheets

(56) References Cited

OTHER PUBLICATIONS

John V., "Standby Power Supply with High Frequency Isolation", *1995 Applied Power Electronics Conference and Exposition*, Dallas, Texas, Mar. 5, 1995, pp. 990-994.

Manias S. et al., "A Novel Sinewave in AC to DC Converter with High-Frequency Transformer Isolation", *IEEE Transactions on Industrial Electronics*, vol. 1E-32, No. 4, Nov. 1985, pp. 430-438.

Nielsen P. et al., "Space Vector Modulated Matrix Converter With Minimized Number of Switchings and a Feedforward Compensation of Input Voltage Unbalance", *Proceedings of SPIE*, Jan. 8, 1996, vol. 2, pp. 833-839.

Sun K. et al, "Compensation Control of Matrix Converter Fed Induction Motor Drive Under Abnormal Input Voltage Conditions", *39th Annual IAS Annual Meeting, 2004 IEEE Industry Applications Conference*, Oct. 3, 2004, pp. 623-630.

Vlatkovic V. et al., "A Zero-Voltage Switched, Three-Phase Isolated PWM Buck Rectifier", *IEEE Transactions on Power Electronics*, vol. 10, No. 2, Mar. 1995, pp. 148-157.

\* cited by examiner

FEED FORWARD CONTROL FOR A CYCLO-CONVERTER

RELATED APPLICATIONS

The present application is a 35 U.S.C. §371 national phase application of PCT International Application No. PCT/NZ2011/000110, having an international filing date of Jun. 15, 2011, claiming priority to New Zealand Patent Application No. 586494, filed Jun. 29, 2010. The disclosures of each application are incorporated herein by reference in their entireties. The above PCT International Application was published in the English language and has International Publication No. WO 2012/002825.

FIELD OF THE INVENTION

The present invention relates to feed forward control for a cyclo-converter. In particular, the present invention relates to a method of controlling a cyclo-converter and a cyclo-converter with a feed forward control module, wherein feed forward control is used to control the switching frequency of the cyclo-converter.

BACKGROUND

Many different industries require power supplies for supplying constant power based on a three-phase power source.

Cyclo-converters have been developed for use in efficient power supplies in order to provide a number of improvements over conventional rectifier power supplies and two stage power supplies.

A cyclo-converter provides an efficient single stage power converter. A benefit of adopting single stage power conversion is based on the fact that a single stage converter will have an efficiency similar to the efficiency of either of the individual stages of a conventional two-stage rectifier (e.g. 96%). In other words the losses from a single-stage converter are only half of that of a two-stage converter. This greater efficiency (lower losses) leads to a corresponding decrease in the size of components within the rectifier and hence a smaller product that costs less to produce. Other benefits are obtained by virtue that the exhaust air heat from the converter will be lower for a given system power (easing power system design) and in the fact that a single-stage converter can be realised with considerably fewer components than a conventional two-stage rectifier design.

The present applicants have developed a unique three-phase resonant cyclo-converter configuration as described in PCT publication WO2008/018802, which is hereby incorporated by reference.

This present application relates to an improved method (and associated control system) for controlling a three-phase resonant cyclo-converter, such as the type described in WO2008/018802. It will be appreciated that although power converters such as those described in WO2008/018802 are particularly useful in the telecommunication industry that they may also equally be applicable in other industries.

WO2008/018802 has suggested that proportional and integral feedback elements based on the measured output voltage of the cyclo-converter may be used to control the cyclo-converter's switching frequency. However, these forms of feed back are not able to provide a fast response in situations where the input power to the cyclo-converter substantially varies in a short period of time or is interrupted.

An object of the present invention is to provide an improved control mechanism for a cyclo-converter.

In particular, an object of the present invention is to provide an improved control mechanism for a cyclo-converter when the input power supply substantially varies in a short period of time or is interrupted.

Each object is to be read disjunctively with the object of at least providing the public with a useful choice.

The present invention aims to overcome, or at least alleviate, some or all of the afore-mentioned problems.

SUMMARY OF THE INVENTION

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components which the use directly references, and possibly also of other non-specified components or elements.

According to one aspect, the present invention provides a three-phase resonant cyclo-converter, the cyclo-converter comprising a feed forward control module arranged to develop a feed forward signal for controlling a switching frequency of the cyclo-converter dependent on conditions of a power supply arranged to provide power to the cyclo-converter.

According to a further aspect, the present invention provides a method of controlling a three-phase resonant cyclo-converter, the method comprising the steps of developing a feed forward signal for controlling a switching frequency of the cyclo-converter dependent on conditions of a power supply arranged to provide power to the cyclo-converter.

BRIEF DESCRIPTION OF THE DRAWINGS

Embodiments of the present invention will now be described, by way of example only, with reference to the accompanying drawings, in which.

DETAILED DESCRIPTION OF THE INVENTION

First Embodiment

According to various embodiments of the invention a method and associated control circuitry is provided for developing a feed forward control signal that can adjust the switching frequency of a cyclo-converter dependent upon the power supply of the cyclo-converter.

The cyclo-converter circuit arrangement will now be described with reference to FIG. 1.

Figure 1:
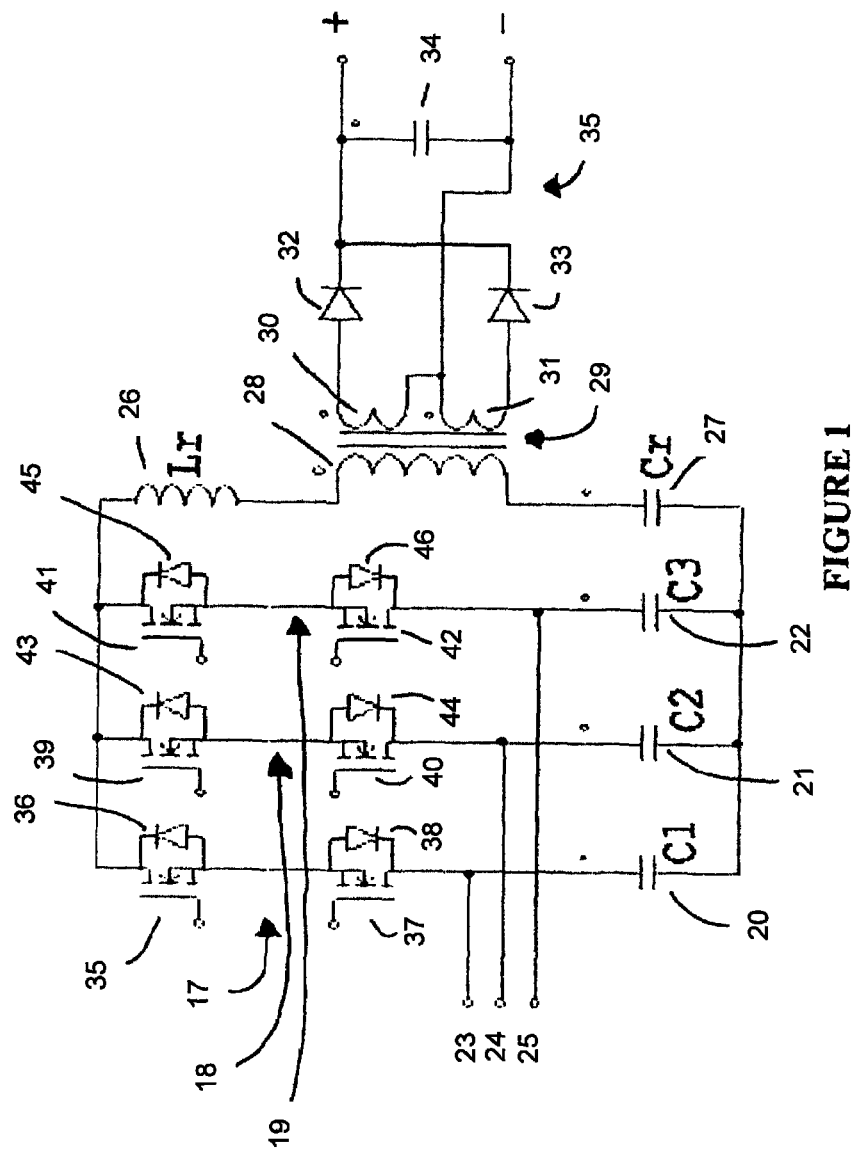
FIG. 1 shows a cyclo-converter arrangement which may be controlled according to an embodiment of the present invention.

FIG. 1 shows a three phase resonant cyclo-converter circuit in the form of a half bridge which uses a control method according to this first embodiment.

It will be understood that this embodiment and other embodiments of the present invention may also be applied to a full bridge cyclo-converter.

The cyclo-converter of FIG. 1 includes bidirectional switches 17 to 19 and capacitors 20 to 22 forming the half bridge. Switch 17 consists of MOSFET 35 in parallel with body diode 36 in series with MOSFET 37 in parallel with body diode 38. Switch 17 has four states:

1. on (MOSFETs 35 and MOSFET 37 on);
2. off (MOSFET's 35 and 37 off)
3. forward diode (MOSFET 37 on switching in body diode 36)
4. reverse diode (MOSFET 35 on switching in body diode 38)

Switches 18 and 19 are similarly configured. By utilizing the four switching states full resonant switching can be achieved as will be described.

Three phase supply lines 23 to 25 provide a three phase AC supply to the half bridge. The output of the cyclo-converter drives an LLC resonant circuit consisting of inductor 26, capacitor 27 and primary coil 28 of transformer 29.

Output coils 30 and 31 are connected via diodes 32 and 33 and capacitor 34 to form half bridge rectifier 35.

Inductor 26 and capacitor 27 form the series-resonant circuit. To achieve low load output voltage regulation the resonant circuit can be easily transformed from a simple LC resonant circuit into an LLC resonant circuit by gapping the core of the main transformer 29. The primary method of output voltage control is achieved by variable frequency control.

The switching sequence of a three phase resonant cyclo-converter will now be described with reference to FIG. 2.

According to this embodiment, the switching frequency of the cyclo-converter is a high frequency. That is, the switching frequency for this embodiment is approximately 100 kHz. However, it will be understood that, as an alternative, other lower or higher switching frequencies may be used.

To achieve the requirements to enable resonant switching the transistors are always sequenced in the order that results in the largest voltage magnitude (L) mains phase transistor being switched on first, followed by the mains phase that has the medium voltage magnitude (M), then finally the mains phase with the smallest mains voltage magnitude (S). This sequencing is repeated indefinitely (L, M, S, L, M, S, . . . ) with a sub-microsecond dead-time to allow for the resonant load voltage commutation. Since the mains instantaneous input voltages are continually changing the sequencing logic responsible for driving the individual transistors reverses the transistor sequencing order every 30 degrees of mains input.

Figure 2:
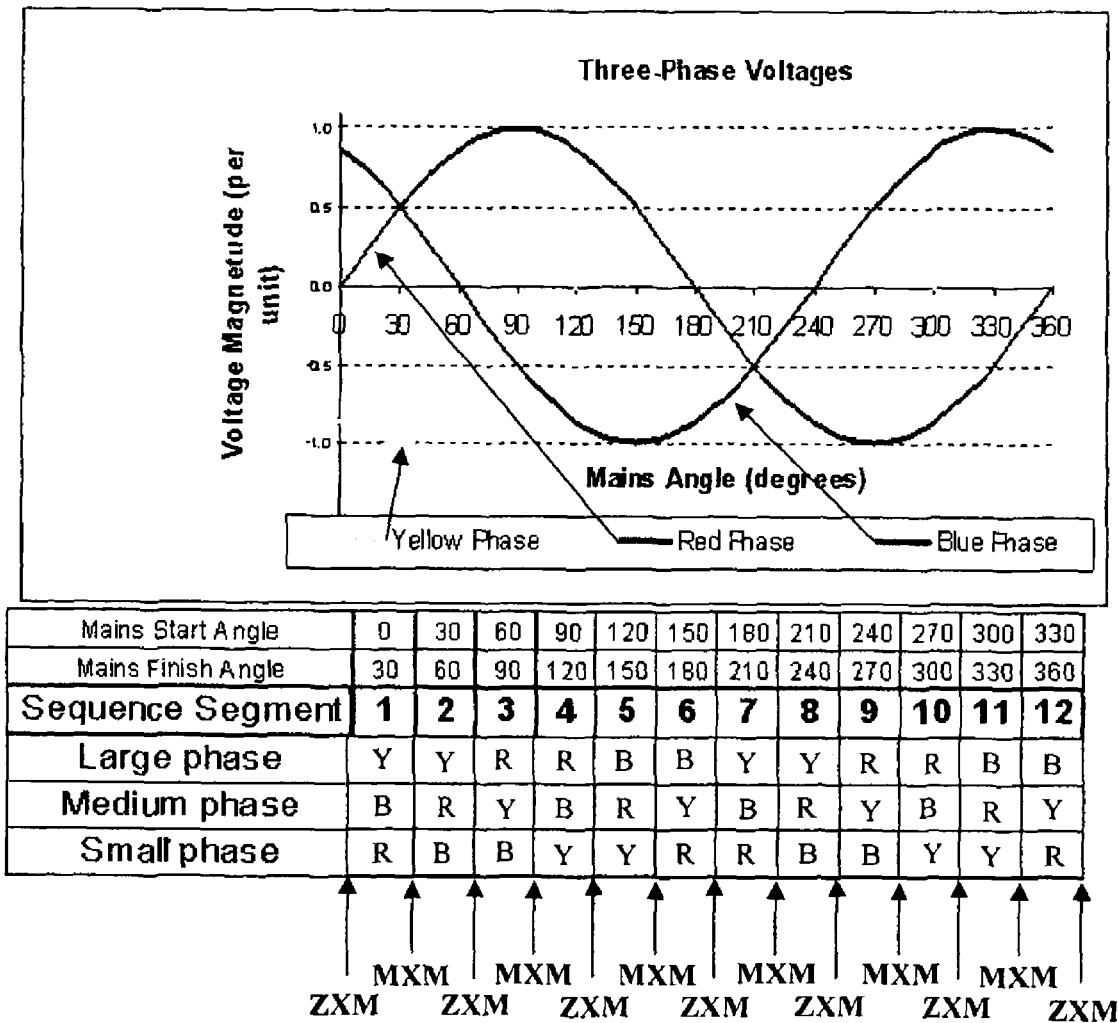
FIG. 2 shows a switching sequence of a cyclo-converter which may be controlled according to an embodiment of the present invention.

FIG. 2 shows the three phase mains instantaneous voltages (Yellow, Blue and Red) over a single mains cycle and the table immediately below the graph shows a logic table that signifies the function of each of the six transistors during each of the 12 mains 30-degree segments:

"Large phase (L)"—The transistor that is controlling the flow of current from the mains phase with the largest voltage magnitude through to the resonant load, transformer, and ultimately the output of the rectifier.

"Medium phase (M)"—The transistor that is controlling the flow of current from the mains phase with the medium voltage magnitude through to the resonant load, transformer, and ultimately the output of the rectifier.

"Small phase (S)"—The transistor that is controlling the flow of current from the mains phase with the smallest voltage magnitude through to the resonant load, transformer, and ultimately the output of the rectifier.

The references Y, B and R in the logic table indicate which of the three mains phase instantaneous voltages Yellow, Blue or Red are the relevant voltage for the indicated phase (L, M or S).

This resonant switching sequence results in sine-wave current flow through the transistors and output rectifier diodes, such that the current has almost returned to zero when each switching transition occurs. This reduces the switching losses in both the transistors and output diodes and allows for either MOSFET or IGBT switching transistors to be used. If IGBT transistors are used anti-parallel diodes may be employed to allow a reverse current path (emitter to collector).

A brief discussion of the various modes of the cyclo-converter is now provided. In FIG. 2, ZXM indicates the position where the zero-cross mode is activated and MXM indicates the position where the magnitude-cross mode is activated, as described below.

Since it becomes impractical to try and turn a transistor on then off again in an extremely small time period, there comes a point (near each mains voltage zero crossing) where there is no benefit in trying to turn the S transistor on. Hence for a period that starts a few degrees before each mains zero crossing and extends to a few degrees after the mains zero crossing the cyclo-converter may operate in a two-phase mode. This mode is referred to as a "zero-cross mode" and during this mode of operation the high frequency switching sequence is simply L, M, L, M, L, M . . . —where only the L and M transistors are switched on and the S transistor remains off. During this "zero-cross mode" the transistor on-times for both the L and the M transistor are equal.

A different issue arises in maintaining the normal L, M, S, L, M, S . . . high frequency switching sequence at the mains voltage magnitude crossing point. At every mains magnitude cross point the M and S phase voltages swap over and hence the definitions of M and S must also swap. If the rate of change of the mains phase voltages is considered with respect to the high frequency switching frequency of the cyclo-converter it becomes clear that the concept of the M and S phase voltages crossing over at a particular instance in time is far from the reality. The rate of change of the mains phase voltages is so slow that for many high frequency switching cycles the M and the S phase voltages are effectively equal. What's more, when real world effects like noise are considered it can also be appreciated that the converter may actually operate for several high frequency switching cycles with incorrect M and S definitions. For example, the voltage on the phase we are calling S is actually greater (by a very small amount) than the voltage on the phase we are calling M. This error in the definition of the M and S phases causes the wrong transistor switching sequence which in turn leads to considerable current flowing from M to S mains phase (or S to M mains phase depending on relative voltage polarities. By changing the high frequency switching sequence used when the cyclo-converter is operating near to a mains voltage magnitude cross point this problem may be avoided.

Therefore, for a period that starts a few degrees before each mains magnitude crossing and extends to a few degrees after the mains magnitude crossing the cyclo-converter may operate in an interleaved mode. This mode is referred to as a "magnitude-cross mode" and during this mode the high frequency switching sequence is simply L, M, L, S, L, M, L, S, . . . —where the M and S transistors are alternately switched on between each time the L transistor is switched on. During this "magnitude-cross mode" the transistor on-times for the L, M, and S transistors are all equal.

Thus the cyclo-converter uses three different high frequency switching sequences: "zero-cross mode"—used near to mains phase zero crossings "Three-phase mode"—the normal mode used the majority of the time "magnitude-cross mode"—used near to mains phase magnitude crossings.

Figure 3:
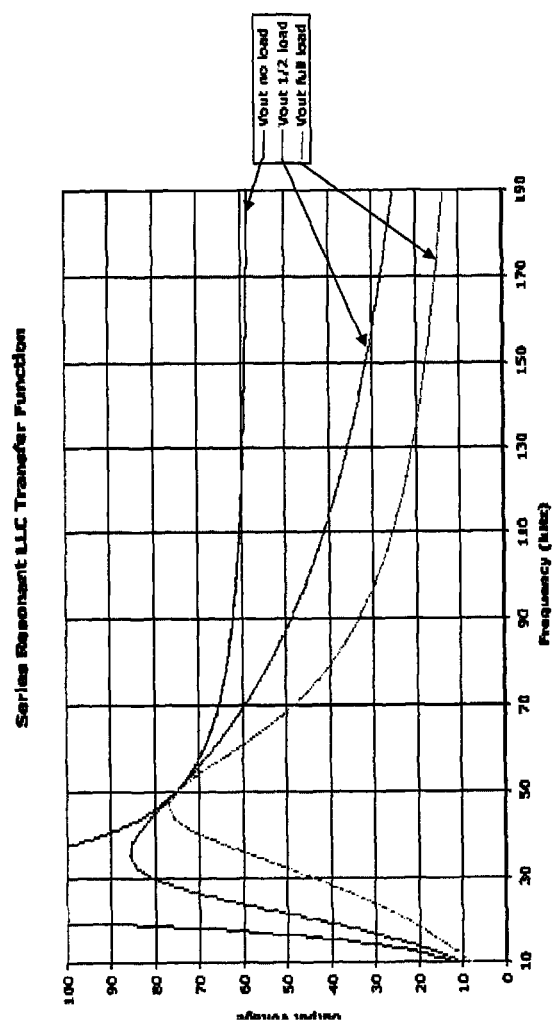
FIG. 3 shows an LLC transfer function for a cyclo-converter as shown in FIG. 1.

FIG. 3 shows the series resonant LLC transfer function for a cyclo-converter of the type described herein. The x-axis shows the switching frequency of the cyclo-converter and the y-axis shows the output voltage of the cyclo-converter. Three characteristics are shown where the cyclo-converter has no load, a half load and a full load. As explained above, in this embodiment the cyclo-converter is operating at a switching frequency of 100 kHz. It can be seen from the transfer function that by increasing the switching frequency above 100 kHz the output voltage drops, and by reducing the switching frequency the output voltage increases.

Figure 4A:
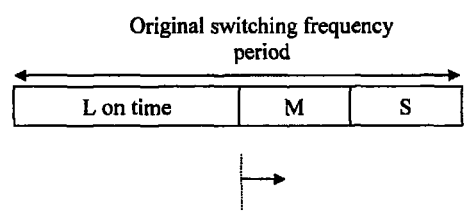
FIGS. 4B and 4B show a representation of a switching period adjustment according to an embodiment of the present invention.
Figure 4B:
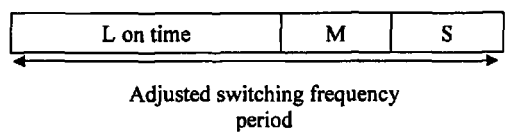

Referring to FIGS. 4a and 4b, a depiction of the L, M and S switching periods for a single switching frequency period is provided.

FIG. 4a depicts the original three switching periods for L, M and S for an unadjusted switching frequency period. A first switching period L determines the on time for the transistors in the cyclo-converter that will switch the largest magnitude input phase voltage signal. That is, the three input phase voltage signals Va, Vb and Vc forming the three-phase voltage power supply input are switched depending on their magnitude by the various transistor pairs as shown in FIG. 1. Switching period L indicates the largest magnitude input phase voltage signal is being switched, switching period M indicates the medium magnitude input phase voltage signal is being switched and switching period S indicates the smallest magnitude input phase voltage signal is being switched.

From FIGS. 4A and 4B, it can be seen that L is switched on for 50% of the time, while M and S share the remaining 50%. That is, the largest magnitude input phase voltage signal is switched through to the LLC circuit for 50% of the switching period, while the medium and small magnitude input phase voltage signals are switched through to the LLC circuit for the remaining 50% of the switching period.

Therefore, it can be seen that by adjusting the L switching period (L on time) of a three-phase resonant cyclo-converter based on differences in the supply voltage to the cyclo-converter, a coarse control of the output voltage is provided. That is, adjusting the L switching period adjusts the switching frequency of the cyclo-converter and so the output voltage.

A feed forward term may be applied to the control circuit to aid in the overall control of the switching frequency. The feed forward term may be used to adjust the L switching period under certain power supply conditions to keep the output voltage constant. This may be useful, for example, in a situation where the input voltage fluctuates by a large amount and an adjustment is required to modify the output voltage quickly. Alternatively, a feed forward adjustment would be useful when a hold up circuit is activated.

The L switching period is adjusted using a combination of a proportional, integral & derivative (PID) control signal fed into a PID controller as well as a feed forward term.

The feed forward term is developed based on an algorithm that takes into account the amount of change in the input supply voltage and the relationship between the amount of change and the required change in the L switching period to maintain a constant voltage output. That is, the algorithm provides an estimate of how much the switching frequency should be changed for a given input voltage disturbance such that the output voltage is maintained. The amount of adjustment of the L switching period may be determined empirically from various test scenarios where the cyclo-converter circuit is placed under varying load conditions and the actual L switching periods that are produced to control the cyclo-converter during steady state conditions are recorded. That is, a set of L steady state values are produced based on various load conditions.

By analysing the steady state values of the L switching time, a set of best fit polynomial values can be generated. For example, the polynomial values generated may be determined based on a function of a change in input voltage signal and the switching frequency of the cyclo-converter.

Figure 5:
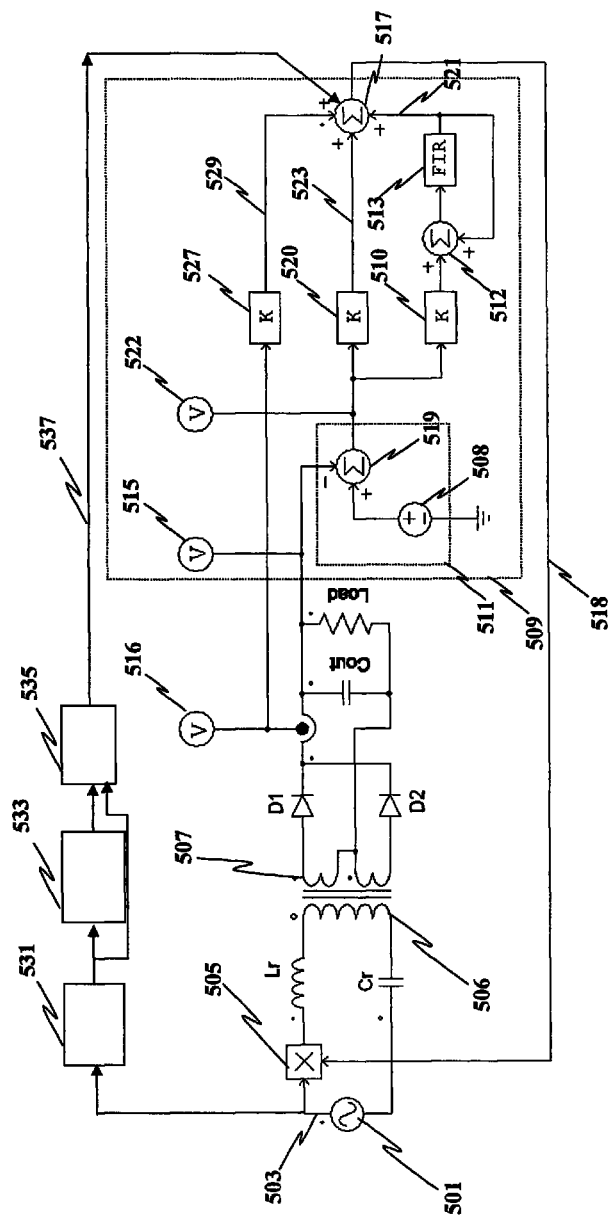
FIG. 5 shows a system block diagram of a control circuit according to an embodiment of the present invention.

FIG. 5 shows a system block diagram indicating the various components of the control circuit.

A three phase power supply 501 provides three-phase power via three voltage phase lines 503 to a cyclo-converter 505. According to this embodiment, the cyclo-converter is as shown in FIG. 1. However, it will be understood that any other suitable type of three phase resonant cyclo-converter may be controlled in a similar manner as described herein.

The cyclo-converter output is a sinusoidal voltage output waveform, which is fed to an LLC resonant circuit, which includes a resonant Inductor (Lr), a resonant capacitor (Cr) and a primary coil 506 of the output transformer.

The secondary coil 507 of the transformer feeds the two diodes D1 and D2 also shown in FIG. 1.

A voltage output waveform taken across the load on the secondary side of the transformer Vout is used by a closed loop control module 509 to develop a voltage error signal Verror 522.

It will be understood that the voltage output of the cyclo-converter may be taken from several different points. The voltage output of the cyclo-converter may be measured across the load placed across the secondary side of the transformer. Alternatively, the voltage signal output from the cyclo-converter may be measured directly from the cyclo-converter output across the primary side of the transformer.

The closed loop control module 509 includes a voltage signal error module 511, an integral gain module 510, an accumulation module 512 and a storage module 513, which forms part of a Finite Impulse Response (FIR) filter. The closed loop control module 509 further includes a PID controller 517, a proportional gain module 520 and a derivative gain module 527.

The voltage signal error module 511 includes a voltage reference generator 508 and a voltage error generator 519, which is arranged to develop an error signal Verror based on a difference between the output voltage 515 of the cyclo-converter and a voltage reference value Vref generated by the voltage reference generator 508. Vref is the desired output voltage for the power converter.

The error signal Verror is fed through an integral gain module 510 and is then added to, combined or accumulated with historic voltage signal values from the storage module 513 using an accumulation module 512 for the same corresponding portion of the output voltage waveform, where the result from the accumulation module 512 is used as an input to the storage module 513 (FIR filter).

Therefore, the storage module 513 is arranged to store error corrected historic voltage signal values for specific portions of the output voltage waveform. That is, the error corrected historic voltage signal values are stored as new voltage signal values within the storage module 513 for the relevant portion of the output voltage waveform. Values within the storage module 513 are output as an integral voltage control signal 521 based on the historic voltage signal values.

The voltage error signal Verror is also provided to a proportional gain module 520 to develop a proportional voltage control signal 523. The proportional voltage control signal 523 is a direct proportional measure of the output voltage Vout.

The measured output voltage may be taken directly across a load placed on a secondary side of a transformer in connection with an output of the cyclo-converter, i.e. a voltage signal developed from the secondary side of an isolation transformer placed on the output of the cyclo-converter is fed back to the control circuit. As an alternative, the output voltage may be measured using other techniques. For example, the load voltage may be measured immediately after the rectifier diodes on the output of the cyclo-converter.

A derivative voltage control signal 529 is also developed using a derivative gain module 527. According to this embodiment, the "derivative voltage" signal is developed by directly measuring the load current 516 using a current sensor on the secondary side of the cyclo-converter output transformer. The load current is sensed on the cathode side of rectifier diodes D1 & D2. As an alternative, the resonant current on the primary side of the cyclo-converter output transformer may be used to develop the load current. That is, a load current development module may sense the resonant current iRes using a current sensor attached to the primary coil 506 of the transformer located on the output of the cyclo-converter. The resonant current iRes is considered an accurate representation of the output current of the transformer as the output capacitance on the secondary side of the transformer (which forms part of the half bridge rectifier) dominates the circuit (i.e. the load is effectively resistive).

The output current of the transformer is considered to be the derivative of the output voltage. Therefore, the measured load current Iout is used to develop the derivative voltage control signal 529 by passing the sensed load current through the derivative gain module 527.

A phase locked loop (PLL) module 531 is provided that develops an input voltage signal by measuring the three phase input voltage lines. The developed input voltage is monitored by a hold up circuit 533 to determine whether the hold up circuit should be activated, as explained in more detail below. The developed input voltage is also provided to the feed forward term generator 535. The feed forward term generator is arranged to develop a feed forward term L_FF 537 based on sudden changes (e.g. step changes) to the input voltage during conditions when the hold up circuit has not been activated. Further, the feed forward term generator is arranged to develop a feed forward term L_FF when the hold up circuit is activated and this causes the voltage fed to the LLC circuit to change due to the change over between the AC mains input and the switched hold up capacitor voltage, and vice versa. The feed forward term generator also develops a feed forward term L_FF based on any major changes in the hold up circuit capacitor voltage while the hold up circuit is active.

The proportional, integral, derivative and feed forward control signals are provided to a PID controller 517, which develops a switching frequency control signal 518 based on the combination of the proportional, integral, derivate and feed forward control signals. This switching frequency control signal 518 is used to control the switching frequency of the cyclo-converter 505 by adjusting a switching frequency period of the switching frequency for a phase of an input voltage waveform having the greatest absolute voltage to achieve frequency control. That is, the L on time is adjusted to change the overall switching frequency period and thus the switching frequency of the cyclo-converter.

By applying the defined algorithm to the developed input voltage signal a feed forward L on term (L_FF) is determined. The L_FF term is added to the control feedback signal to adjust the switching frequency of the cyclo-converter. That is, L_FF may be used in various different scenarios by the control circuit to modify the L switching period, which will adjust the output voltage by adjusting the overall switching period of the cyclo-converter.

In this embodiment L_FF is generated by applying an algorithm that uses polynomial values. The polynomial values are based on the relationship between a change in the input voltage and the subsequent required change in the output voltage.

However, it will be understood that, as an alternative, a look up table could also be used to generate the L_FF values.

According to this embodiment, the feed forward term L_FF is added to the control output of the feedback control circuit at all times. However, the L_FF term will only affect the control output if there is a sufficient step change in the input voltage supply. In general terms the L_FF feed forward term is added to the integral term. The L_FF term effectively "resets" the integral term, i.e. deletes the integral history, when there has been a step input change.

The input voltage signals are monitored constantly by feeding the input voltage signals to a phase locked loop (PLL) circuit, which is arranged to develop an input voltage signal that represents the voltage on the three input phase voltage lines being used to feed power to the cyclo-converter.

Any change in the input voltage will generate a L_FF output according to the algorithm being used. This L_FF feed forward term is then fed to the PID controller in the control circuit to adjust the L on switching period.

According to this embodiment, the algorithm used has a direct relationship between the percentage change in input voltage and the percentage change in the required output voltage. That is, if the input voltage drops by x % then the control circuit is arranged to provide a feed forward L_FF term that adjusts the L switching period enough to produce a x % increase in the output voltage. It will be understood that, as an alternative, other direct relationships between the input and output voltage may be used. It will also be understood that the relationship between the input voltage and output voltage may be a linear or non-linear relationship.

As mentioned above, there are various different scenarios where it would be beneficial to have a feed forward L_FF term that can adjust the L switching period, and so adjust the switching frequency of the cyclo-converter.

For example, according to a first scenario, the feed forward L_FF term may be used to adjust the switching frequency in a situation where the monitored input voltage has varied substantially in a short period of time, such as a step change, as described above.

According to a second scenario, the feed forward L_FF term may be used when a hold up circuit has been activated due to a loss of input power.

A hold up circuit provides a mechanism for supporting load voltages for 10 mS or more when a utility fault occurs. This is particularly useful in critical data centre applications.

For example, when there is a loss of power, the hold up circuit is activated and the L_FF term is used to control the switching frequency during the changes in input voltage caused by the loss of the AC power supply, the application of the hold up circuit voltages and the return to using the AC power supply.

A hold up circuit description is now provided as background.

Figure 6:
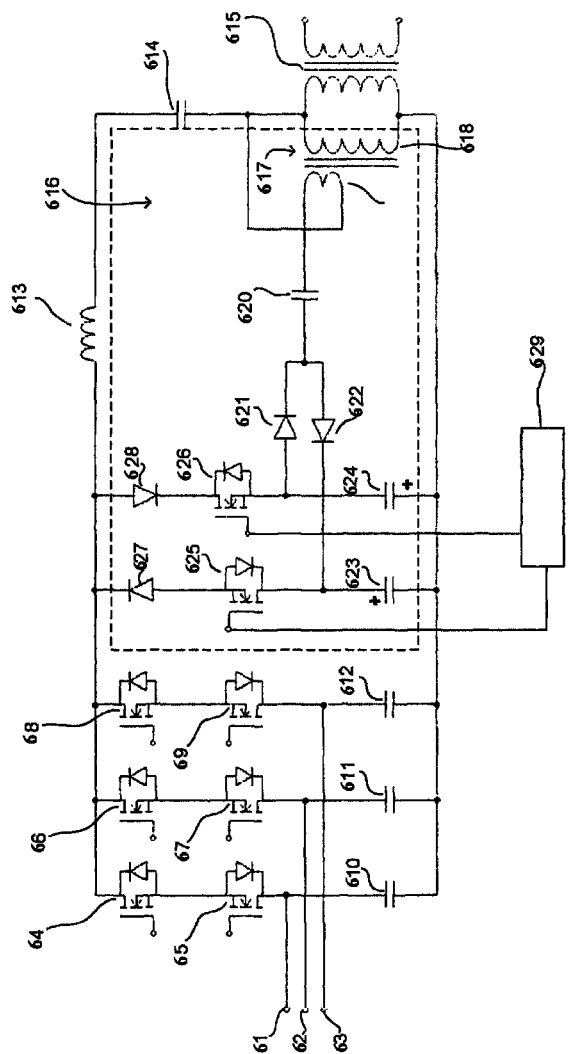
FIG. 6 shows a hold up circuit for use with the control circuit of FIG. 5.

FIG. 6 shows a circuit diagram in which an auxiliary converter 616 (within the dashed box) in the form of a buck converter is included to provide hold up during loss of input power to the cyclo-converter.

FIG. 6 shows a full wave auxiliary converter 616, the output of which is isolated from the cyclo-converter and output transformer 615 during normal input power supply to the cyclo-converter. Transformer 617 is connected in parallel with output transformer 615 and the turns ratio of turns 618 to turns 619 of transformer 617 may be selected to charge capacitors 623 and 624 as will be described. Instead of utilizing a separate transformer winding 619 could be overwound on transformer 615. Capacitors 623 and 624 are charged via a charging path independent of the output path of auxiliary converter 616 via capacitor 620 and diodes 621 and 622. Controlling charging via a charging path independent of the output path prevents excessive inrush current to capacitors 623 and 624 which may otherwise hold down the primary converter output at start up. Capacitor 620 could be any impedance and controls the charge rate of capacitors 623 and 624. If a resistor is substituted for capacitor 620 then resistance losses will be incurred. A frequency dependant impedance has the advantage of lower losses and that the charging rate may vary with cyclo-converter switching frequency. Whilst an inductance would have the most desirable frequency dependency this would incur the cost and size of an additional inductive element. A capacitor has the advantage of low losses, small size and low cost. A compound impedance may also be utilised. The size of the impedance, in this case capacitor 620, is set such that capacitors 623 and 624 are charged within an acceptable period and an undue load is not placed on the cyclo-converter.

The turns ratio of windings 618 and 619 of transformer 617 are preferably set so that capacitors 623 and 624 are charged to a level well above the normal output voltage of the cyclo-converter supplied to transformer 615. In this way auxiliary converter 616 may better utilize the charge stored in capacitors 623 and 624.

The blocking diodes of FETs 625 and 626 are opposed to diodes 627 and 628 so that capacitors 623 and 624 are isolated from the cyclo-converter and output transformer 615 when the FETs 625 and 626 are switched off. Where there is a discontinuity of the input power supply to power supply lines 1 to 3 the charge stored in capacitors 623 and 624 may be supplied via FETs 625 and 626 and diodes 627 and 628 to output transformer 615 to maintain the output supply from the power converter. According to this embodiment, the hold up control circuit 629 monitors the input power supply by receiving the output from the PLL 531. When a discontinuity in supply is detected, the hold up control circuit 629 controls the switching of FETs 625 and 626 so that the charge stored in capacitors 623 and 624 is used to maintain output supply. Hold up control circuit 629 switches FETs 625 and 626 at a relatively high frequency (about 100 kHz) during operation of the auxiliary converter to provide a high frequency AC output voltage to output transformer 615. Diodes 627 and 628 are selected to have a slow switching speed relative to the switching speed of FETs 625 and 626 so that after a FET 625 or 626 has been conductive the associated diode 627 or 628 remains on when the other FET is switched on so as to enable zero voltage switching (ZVS). For example if FET 625 is initially switched on diode 627 becomes conductive and charge from capacitor 623 is supplied to output transformer 615. When FET 625 is switched off diode 627 is slow to turn off and remains conductive when FET 626 is switched on so that a conductive path remains via diode 627 and the blocking diode of FET 625 so that ZVS switching may be performed. In this way the output of the auxiliary converter may be isolated during normal operation but diodes 627 and 628 are essentially conductors during operation of the auxiliary converter to allow ZVS switching. This arrangement also has the advantage of using relatively inexpensive slow switching diodes 627 and 628.

According to this embodiment, the voltage on the input phases is monitored by the PLL to determine when there is any loss or significant reduction of the input voltage. The hold up control circuit 629 uses the monitored input voltage information to make a decision as to when to change power from AC over to the hold-up circuit. Further, the feed forward term generator 535 monitors the hold up capacitor voltage to determine how the switching frequency is to be changed if the hold up circuit is activated.

Therefore, if the input voltage falls below a pre-determined minimum voltage then it is determined that the mains input voltage is not sufficient and the PLL sends a signal to the hold up circuit to instruct it to switch over from AC input to the hold up capacitors of the hold-up circuit.

The voltage on the hold-up capacitors is monitored by the feed forward term generator so that when the control circuit has switched over to the hold up circuit, the feed-forward algorithm within the generator has the voltage information from the hold up capacitor to determine what change in switching frequency is required and so produce the required L_FF term to provide the required switching frequency change.

That is the feed forward algorithm of the feed forward term generator is fed two inputs—the mains voltage and the hold-up capacitor voltage. Based on these two voltage inputs, the algorithm makes the following calculation.

It is first determined how much the switching frequency needs to be changed by if the hold up control circuit determines that the supply for the cyclo-converter is to switched over from the mains input to the hold-up circuit. This calculation continually changes and for the majority of the time this calculation will be made and then not used. However, when the hold up control circuit determines that the converter should switch over to the hold-up circuit, then the feed forward algorithm result L_FF produced by the feed forward term generator will be used to create the necessary step change by adjusting the L switching time.

Therefore, the feed-forward algorithm may be used to make a prediction as to how much to change the switching frequency should the control circuitry decide to switch over from mains to the hold-up circuit, as well as compensating for any sudden mains input voltage changes, which do not require the hold up circuit to be activated. That is, the two scenarios include sudden changes in the mains input voltage and sudden changes because the control circuit has decided to switch from mains input to the hold-up circuit, and vice versa.

In the above scenarios, the sudden change in input voltage to the cyclo-converter must be acted upon quickly to provide an adjustment which ensures a constant voltage is continually output. Using standard feedback control loops does not provide a quick enough response time and would result in voltage drift on the output.

In general, L_FF is used within the control circuitry to "reset" the currently used L value in order to adjust the switching frequency to a value that can more easily be adjusted by the feedback control loop. The feed-forward term (L_FF) is added to the voltage control loop output to modify the L switching period (L on time) and to minimise any "integrator wind-up". That is, the I term in the PID loop is an error integrator. It is known that when an integrator is subjected to a step change such as a sudden change in input voltage its output will "wind-up", i.e. the output will take some time to settle down to the new operating point.

By utilising a feed-forward L on term, this effect is avoided. The feed-forward L on term provides a "better guess" at the new correct operating point. This better guess provides an improved result that reduces the amount of integral "wind-up" when a step change has occurred. This therefore reduces the time that the PID control loop will take to respond to any step changes.

It will be understood that the embodiments of the present invention described herein are by way of example only, and that various changes and modifications may be made without departing from the scope of invention.

The invention claimed is:

1. A three-phase resonant cyclo-converter, comprising:
a phase locked loop module arranged to develop an input voltage signal based on the three-phase input voltage;
a feed forward control module arranged to develop a feed forward signal for controlling a switching frequency of the cyclo-converter dependent on conditions of a power supply arranged to provide power to the cyclo-converter, based on the developed input voltage signal; and
a switching signal generator arranged to develop a switching signal that controls the switching frequency of the cyclo-converter, and further arranged to modify the switching signal based on the developed feed forward signal.

2. The cyclo-converter of claim 1, wherein the modified switching signal is based on a determined high voltage switching sequence.

3. The cyclo-converter of claim 1, wherein the feed forward control module is arranged to apply a direct relationship between the developed input voltage and a desired output voltage to develop the feed forward signal.

4. The cyclo-converter of claim 1, wherein the feed forward control module is arranged to apply pre-determined polynomial values to an input voltage signal to develop the feed forward signal, wherein the polynomial values are based on a function of a change in input voltage signal and the switching frequency of the cyclo-converter.

5. The cyclo-converter of claim 1, further comprising a storage module arranged to store a look up table, wherein the feed forward control module is arranged to apply values in the look up table based on the input voltage signal to develop the feed forward signal, wherein the values in the look up table are based on a function of a change in input voltage signal and the switching frequency of the cyclo-converter.

6. The cyclo-converter of claim 1, further comprising a PID controller module, wherein the feed forward control module provides the developed feed forward signal to the PID controller to generate the modified switching signal.

7. The cyclo-converter of claim 1, wherein the feed forward control module is arranged to detect discontinuities in the power supply of the cyclo-converter based on the developed input voltage signal.

8. The cyclo-converter of claim 1, wherein the feed forward control module is arranged to detect sudden changes in voltage output from the power supply based on the developed input voltage signal, where the change is above a predefined threshold value.

9. The cyclo-converter of claim 1, wherein the feed forward control module is arranged to detect an event that relates to a discontinuity in the power supply.

10. The cyclo-converter of claim 9, wherein the feed forward control module is further arranged to monitor a hold up circuit module to detect whether the hold up circuit module has been activated.

11. The cyclo-converter of claim 10, wherein the feed forward control module is further arranged to monitor a hold up voltage generated by the hold up circuit module to develop the feed forward signal.

12. The cyclo-converter of claim 1, wherein the cyclo-converter is a half bridge cyclo-converter.

13. The cyclo-converter of claim 1, wherein the cyclo-converter is a full bridge cyclo-converter.

14. The cyclo-converter of claim 1, wherein the cyclo-converter is a high frequency cyclo-converter.

15. A method of controlling a three-phase resonant cyclo-converter, comprising:
developing a feed forward signal for controlling a switching frequency of the cyclo-converter dependent on conditions of a power supply arranged to provide power to the cyclo-converter; and
applying predetermined polynomial values to an input voltage signal to develop the feed forward signal, wherein the polynomial values are based on a function of a change in input voltage signal and the switching frequency of the cyclo-converter.

16. The method of claim 15, further comprising,
developing a switching signal that controls the switching frequency of the cyclo-converter; and
modifying the switching signal based on the developed feed forward signal.

17. The method of claim 16, wherein the modified switching signal is based on a determined high voltage switching sequence.

18. A method of controlling a three-phase resonant cyclo-converter, comprising:
developing a feed forward signal for controlling a switching frequency of the cyclo-converter dependent on conditions of a power supply arranged to provide power to the cyclo-converter;
storing a look up table, and
applying values in the look up table based on the input voltage signal to develop the feed forward signal, wherein the values in the look up table are based on a function of a change in input voltage signal and the switching frequency of the cyclo-converter.

19. A method of controlling a three-phase resonant cyclo-converter, comprising:
developing a feed forward signal for controlling a switching frequency of the cyclo-converter dependent on conditions of a power supply arranged to provide power to the cyclo-converter; and
providing the developed feed forward signal to a PID controller to generate the modified switching signal.

20. A method of controlling a three-phase resonant cyclo-converter, comprising:
developing a feed forward signal for controlling a switching frequency of the cyclo-converter dependent on conditions of a power supply arranged to provide power to the cyclo-converter; and
detecting sudden changes in voltage output from the power supply based on the developed input voltage signal, where the change is above a predefined threshold value.

21. The method of claim 20, further comprising the step of detecting an event that relates to a discontinuity in the power supply.

22. The method of claim 21, further comprising the step of monitoring a hold up circuit to detect whether the hold up circuit has been activated.

* * * * *